United States Patent
Gibbs (10) Patent No.: US 6,452,935 B1
(45) Date of Patent: Sep. 17, 2002

(54) STREAM ALLOCATION IN HOME NETWORKS

(75) Inventor: Simon J. Gibbs, San Jose, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 0 days.

(21) Appl. No.: 09/200,173

(22) Filed: Nov. 25, 1998

(51) Int. Cl.$^7$ .............................. H04N 7/10; H04N 7/14
(52) U.S. Cl. ....................... 370/439; 370/437; 370/443; 725/95
(58) Field of Search ............................ 345/327; 348/13, 348/12, 6, 7, 10, 383, 384, 385, 387; 455/6.3, 6.2, 6.1, 3.1, 4.2, 7.1; 370/437–439, 443, 229, 230; H04N 7/10, 7/14; H04M 7/00, 1/02, 1/00

(56) References Cited

U.S. PATENT DOCUMENTS

| | | | |
|---|---|---|---|
| 4,893,199 A | | 1/1990 | Okada .......................... 360/48 |
| 5,420,573 A | | 5/1995 | Tanaka et al. .......... 340/825.24 |
| 5,463,629 A | * | 10/1995 | Ko ............................ 370/110.1 |
| 5,537,605 A | | 7/1996 | Teece .......................... 395/800 |
| 5,634,006 A | * | 5/1997 | Baugher et al. ........ 395/200.06 |
| 5,745,837 A | * | 4/1998 | Fuhrmann .................... 455/5.1 |
| 5,815,678 A | * | 9/1998 | Hoffman et al. ............. 395/309 |
| 5,909,594 A | * | 6/1999 | Ross et al. ................... 395/840 |
| 6,151,696 A | * | 11/2000 | Miller et al. ................. 714/748 |
| 6,229,788 B1 | * | 5/2001 | Graves et al. ............... 725/118 |

FOREIGN PATENT DOCUMENTS

| | | | |
|---|---|---|---|
| JP | 2767795 | 3/1989 | ............. H04L/5/22 |

OTHER PUBLICATIONS

Sony et al.; "The Havi Architecture"; Specification of the Home Audio/Video Interoperability (HAVI) Architecture; May 11, 1998; Copyright 1997, 1998.

* cited by examiner

Primary Examiner—Andrew Faile
Assistant Examiner—Vivek Srivastava
(74) Attorney, Agent, or Firm—Wagner Murabito & Hao LLP (57) ABSTRACT

A method and system for automatically allocating bandwidth on a network bus in an audio/visual network. The present invention implements an intelligent process to automatically make adequate bus bandwidth available when a request for a connection (e.g., a communication channel used to transfer data) between a source device and a sink device is received. First, the present invention determines whether a communication channel is already allocated to the source device, and if so, the connection between the source device and the sink device is made using an overlay of the existing communication channel. Otherwise, the present invention compares the required bus bandwidth capacity for the source device with the available bus bandwidth capacity. Using voluntary and forced load shedding techniques, the present invention deallocates bus bandwidth capacity allocated to one or more of the devices on the audio/visual network if the available bus bandwidth capacity is less than the required bus bandwidth capacity. The present invention allocates a new channel between the source device and the sink device when the available bus bandwidth capacity is greater than or equal to the required bus bandwidth capacity.

21 Claims, 6 Drawing Sheets

STREAM ALLOCATION IN HOME NETWORKS

TECHNICAL FIELD

The present invention relates to the field of consumer electronic devices. In particular, the present invention pertains to a system and method for allocating bandwidth on a home network.

BACKGROUND ART

The typical entertainment system (e.g., that might be found in a home or office) consists of a variety of different consumer electronic devices which present and record audio/visual (AV) media in different ways. For instance, typical AV equipment found in a home includes a number of components such as a radio receiver or "tuner," a compact disk (CD) player and/or a digital video disc player (DVD), a number of speakers, a television, a video cassette recorder (VCR), a tape deck, and the like. Each of these components are connected to each other via a set of wires.

One component is usually the central component of the AV system; for example, the tuner. The central component has a number of specific inputs for coupling the other components. The central component has a corresponding number of control buttons or control switches which provide a limited degree of controllability and interoperability for the components. A user controls the AV system by manipulating the buttons and switches on the front of the central component or, alternatively, by manipulating buttons on a hand-held remote control unit. This conventional AV system paradigm has become quite popular.

Consumer electronic devices have become more capable and more complex, and the demand for the latest and most capable devices has increased. As new devices emerge and become popular, the devices are purchased by consumers and "plugged" into their home or office AV systems. In turn, the conventional AV system paradigm is being replaced with a home or office AV network architecture for networking consumer electronic devices. The AV network architecture provides a powerful platform on which device functionality and interoperability can be built, and is capable of taking advantage of the increased sophistication that is being incorporated into consumer electronic devices.

The underlying structure of a home or office AV network consists of a set of interconnected clusters of consumer electronic devices. Typically, there may be more than one cluster in a home or office, perhaps one per floor or one per room. Each cluster functions as a set of interconnected devices to provide services to a single user or to multiple simultaneous users. A central component such as a set top box provides overall control and coordination of the network, although typically there is more than one user interface for providing user input and commands to the devices on the network. The consumer electronic devices on the AV network are interconnected by a serial bus.

A communication standard, the IEEE 1394 standard, has been proposed for networking consumer electronic devices using a standard communication protocol layer. The IEEE 1394 standard is an international standard for implementing an inexpensive high-speed serial bus architecture which supports both asynchronous and isochronous format data transfers. The IEEE 1394 standard provides a high-speed serial bus for interconnecting digital devices, thereby providing universal input/output connection. The IEEE 1394 standard defines a digital interface for applications, thereby eliminating the need for an application to convert digital data to an analog form before it is transmitted across the bus. Correspondingly, a receiving application will receive digital data, not analog data, from the bus and will therefore not be required to convert analog data to digital form. The IEEE 1394 standard is ideal for consumer electronics communication in part because devices can be added to or removed from the serial bus while the bus is active.

One problem with an AV network is associated with the maximum bandwidth capacity of the network bus. That is, there is a maximum rate at which the network bus can carry data; a typical bandwidth capacity is 100–200 megabits/second. Each device on the AV network consumes a certain amount of the available bandwidth capacity when the device is transmitting data; for example, a video camera typically transmits data at a rate of 30 megabits/second. Therefore, in an AV network with a total bandwidth capacity of 100 megabits/second, a video camera consumes 30 megabits/second of the total, leaving 70 megabits/second remaining for other devices to use.

A problem occurs when the AV network is operating at or near its bandwidth capacity. A user may wish to transmit data from one device on the network to another device on the network, but the data transfer cannot occur because it requires more bandwidth capacity then is available. Likewise, a user may wish to add to the network a new device that requires more bandwidth capacity than is available. The problem is exacerbated when there is more than one user of the AV network, and further exacerbated by the physical separation between devices in a AV network. Typically, the users will be acting independently, out of sight of each other and perhaps out of sight of the devices they are operating. Hence, the prior art is problematic because it is difficult for the users to coordinate their actions, in order to try and determine, first, what devices are functioning on the network and, second, which devices are using or causing the bandwidth capacity of the bus to be exceeded.

The prior art is also problematic because the information available to the user or users is probably not sufficient enough for them to make an informed choice regarding which device or devices to turn off when bus bandwidth is exceeded. For example, without information about the required bandwidth capacity of each device, turning off devices indiscriminately may not free up enough bandwidth capacity. There also may be alternatives available that the users are not aware of, such as reducing the bandwidth being utilized by a device by terminating one of the applications the device is running, instead of turning the device off. Without adequate information, a disadvantage to the prior art is that devices are turned off unnecessarily to the dismay of one user, when in fact other steps could have been taken to reach a satisfactory solution.

Another disadvantage to the prior art is the need to manually swap out one device for another on a periodic basis, while trying to balance the bandwidth requirements of the various devices against the capacity of the network, will be viewed as an inconvenience by many home users. In addition, as devices and their applications become more complex, and as the number of devices on home AV networks grow, the capability to manage the network as described above may be beyond the expertise of many home users.

SUMMARY OF THE INVENTION

Therefore, what is needed is a mechanism that assists users in identifying bandwidth capacity that is or can be made available when a device is added to a home AV network or when a new connection between devices on the network is needed. What is also needed is a mechanism that assists the user in determining which devices and applications can or should be shut off to create the required bandwidth capacity. What is further needed is a mechanism that is user friendly and conveniently implemented in a home AV network.

Accordingly, the present invention provides an automatic mechanism to assist users in identifying bus bandwidth capacity that is or can be made available when a device is added to an AV network or when a new connection is needed between devices on the network. The present invention also provides a mechanism that assists the user in determining which devices and applications can or should be shut off to create the required bus bandwidth capacity. The present invention is user friendly and conveniently implemented in an AV network. These and other objects and advantages of the present invention will no doubt become obvious to those of ordinary skill in the art after having read the following detailed description of the preferred embodiments which are illustrated in the various drawing figures.

The present invention provides a method and system for automatically freeing up and allocating bandwidth on a network bus in an AV network. When a request for a new connection (e.g., a communication channel) between two devices (e.g., a source device and a sink device) is received, the present invention implements an intelligent process to determine if a new channel is needed, and to make adequate bus bandwidth capacity available if so. First, the present invention determines whether a communication channel is already allocated to the source device, and if so, the connection between the source device and the sink device is made using an overlay of the existing channel. Otherwise, the present invention compares the required bus bandwidth capacity for the source device with the available bus bandwidth capacity. The present invention then implements voluntary and forced load shedding techniques, and deallocates bus bandwidth capacity allocated to one or more of the devices on the network if the available bus bandwidth capacity is less than the required bus bandwidth capacity. The present invention allocates a new channel between the source device and the sink when the available bus bandwidth capacity is greater than or equal to the required bus bandwidth capacity.

Specifically, in the present embodiment, the present invention described herein identifies existing communication channels that are unused and deallocates those channels as necessary until available adequate bus bandwidth capacity is available. The present invention also identifies bus bandwidth capacity allocated to cooperating applications and, after receiving authorization from the cooperating applications, deallocates that bandwidth capacity to the extent necessary to make available adequate bus bandwidth capacity (e.g., voluntary load shedding). The present invention also identifies bus bandwidth capacity allocated to devices that are designated as low priority by a user of the network, and deallocates the bus bandwidth capacity allocated to the lowest priority device to the extent necessary to make available adequate bus bandwidth capacity (e.g., forced load shedding).

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer system memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "operating," "calculating," "determining," "displaying," or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems, such as, for example, optical and mechanical computers.

HAVI Architecture Network

Embodiments of the present invention are operable within a network of consumer electronics devices compliant with the home audio/visual interoperability (HAVI) architecture. Aspects of the HAVI architecture network are described below to provide a general framework in which embodiments of the present invention operate.

HAVI is an architecture for interoperating consumer electronic devices adapted for the home audio/visual (AV) network. The interoperability aspects of the devices define an architectural framework that allows devices of any vendor to work within the home network. A feature of the HAVI architecture is the combination of a base set of generic device controls (e.g., device control software elements) with a methodology to extend the base control protocol as new features and devices are coupled to the network. The HAVI architecture supports a wide range of consumer electronic devices including integrated receiver/decoders (IRDs), digital video tape records (DVTRs), video cassette recorders (VCRs), personal computer systems (PCs), digital video disk players (DVDs), home servers, etc., communicating via a common messaging system.

Figure 1:
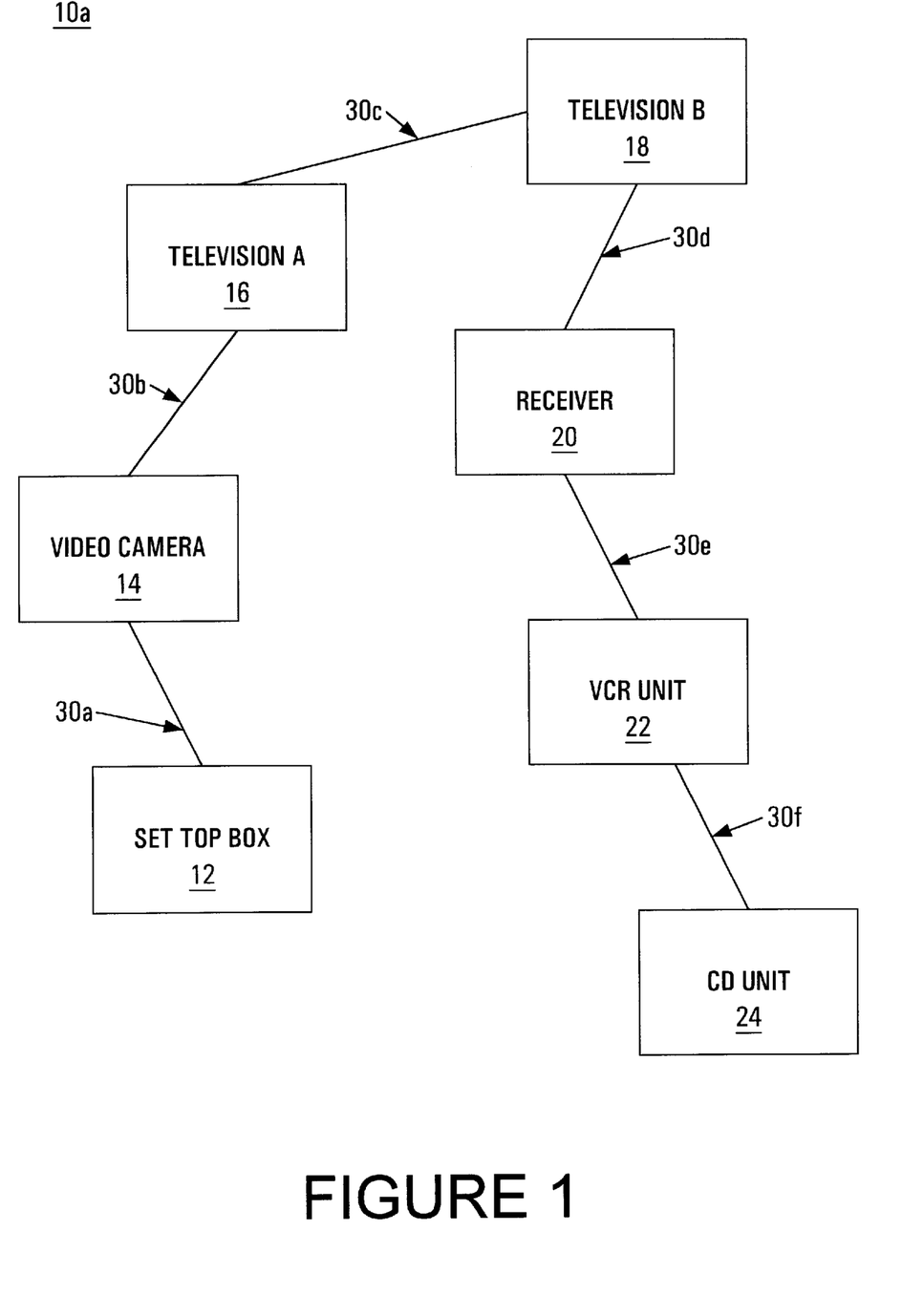
FIG. 1 illustrates a physical port connection topology of an exemplary device configuration of a home audio/visual network in accordance with one embodiment of the present invention.

FIG. 1 illustrates the physical port-to-port connection configuration 10*a* of an exemplary HAVI architecture network. Several consumer electronic devices 12–24 are shown connected together with bus segments 30*a*–30*f*, which couple to ("plug into") ports on the respective electronic devices.

Figure 2:
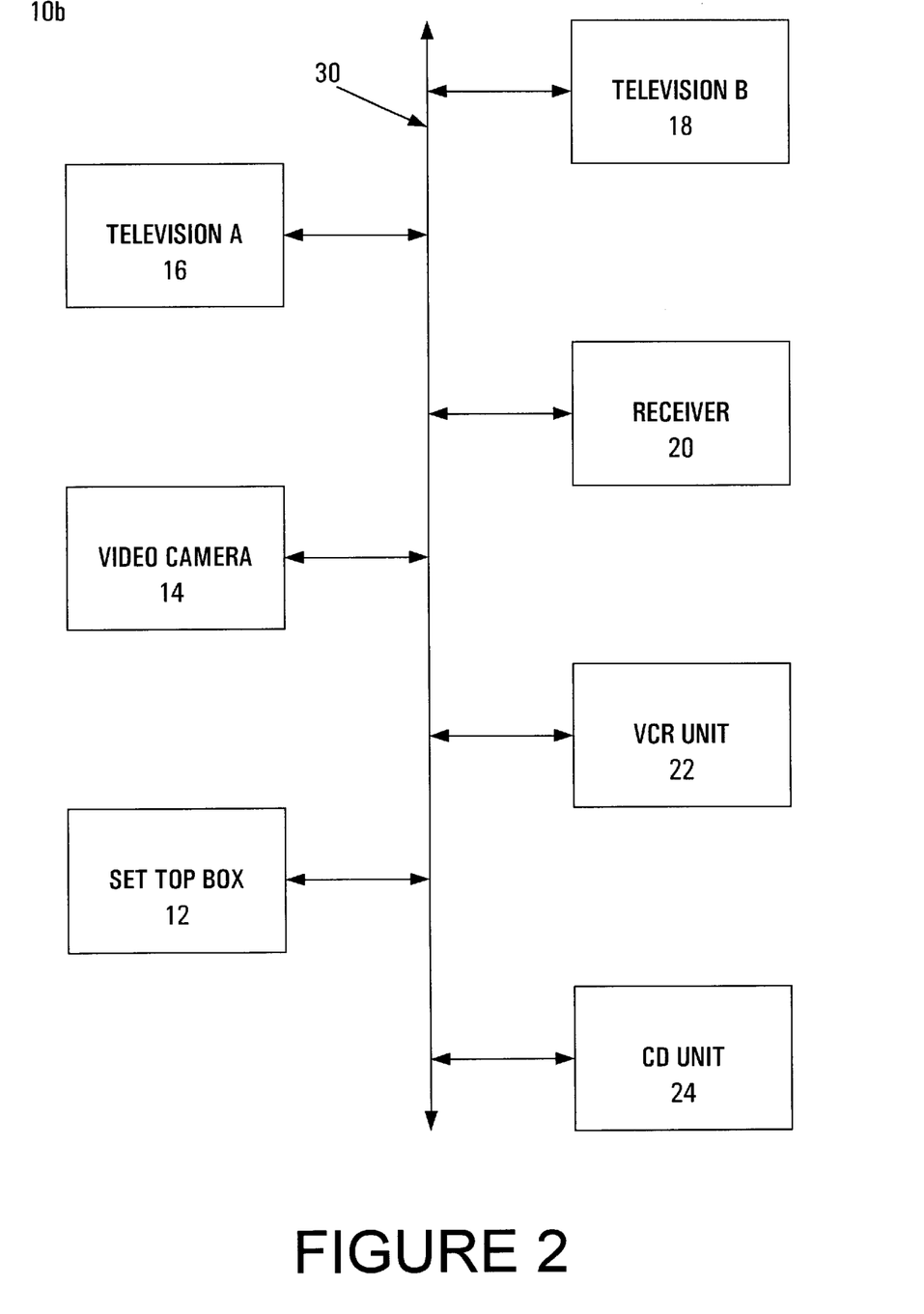
FIG. 2 illustrates a logical bus topology of the home audio/visual network of FIG. 1 in accordance with the present invention.

FIG. 2 illustrates a bus configuration 10*b* of the exemplary HAVI architecture network of FIG. 1. As shown in FIG. 2, all of consumer electronic devices 12–24 of the HAVI architecture network can be viewed as coupled to network bus 30. Within bus configuration 10*b*, peer-to-peer device communication is supported. Generally, and as used herein, a device sending data is a source device, and a device receiving data is a sink device.

In order for a source device to send data to a sink device, a communication channel between those two devices must be allocated on network bus 30. In certain cases, as will be explained later herein, two devices can also exchange data using an overlay of an existing channel. Thus, any device (having appropriate capabilities that make it compliant with the HAVI architecture) can send or receive data from any other device in the HAVI architecture network, provided that a communication channel between the devices is allocated on network bus 30.

In the HAVI architecture, a software element referred to as a stream manager is used to determine the most effective route to carry data between devices within the home network. The responsibilities of the stream manager include: configuration of connections; requesting allocation of network resources; and maintenance of global connection information. The stream manager may also maintain a map of all stream connections within the home network. Additional information regarding the stream manager and its implementation is provided in the patent application entitled "Method and System for Updating Device Identification and Status Information After a Local Bus Reset Within a Home Audio/Visual Network;" Filing Date Jan. 6, 1998; Ser. No. 09/003,118; by Feng Zou; assigned to the assignee of the present invention and hereby incorporated by reference.

The stream manager executes on HAVI-compliant devices referred to in HAVI nomenclature as a full audio/visual (FAV) node or device and an intermediate audio/visual (IAV) node or device. A FAV device contains a complete set of the HAVI software elements that make up the HAVI architecture. A FAV device typically incorporates a central processor unit and volatile and nonvolatile memory coupled via an internal bus which interfaces with network bus 30 of FIG. 2. The primary distinguishing feature of a FAV device is that it is able to take control responsibility for less sophisticated devices. Examples of FAV devices include set top boxes (e.g., set top box 12 of FIG. 2), smart TVs, general purpose home control devices, and home PCs. An IAV device is generally a lower cost device that has limited resources. However, IAV devices can provide support for control of particular devices on the home network. Additional information regarding FAV and IAV devices is provided in the patent application entitled "A Home Audio Video Network with Device Control Modules for Incorporating Legacy Devices;" Filing Date Jan. 6, 1998; Ser. No. 09/003,252; by Rodger J. Lea; assigned to the assignee of the present invention and hereby incorporated by reference.

Figure 3:
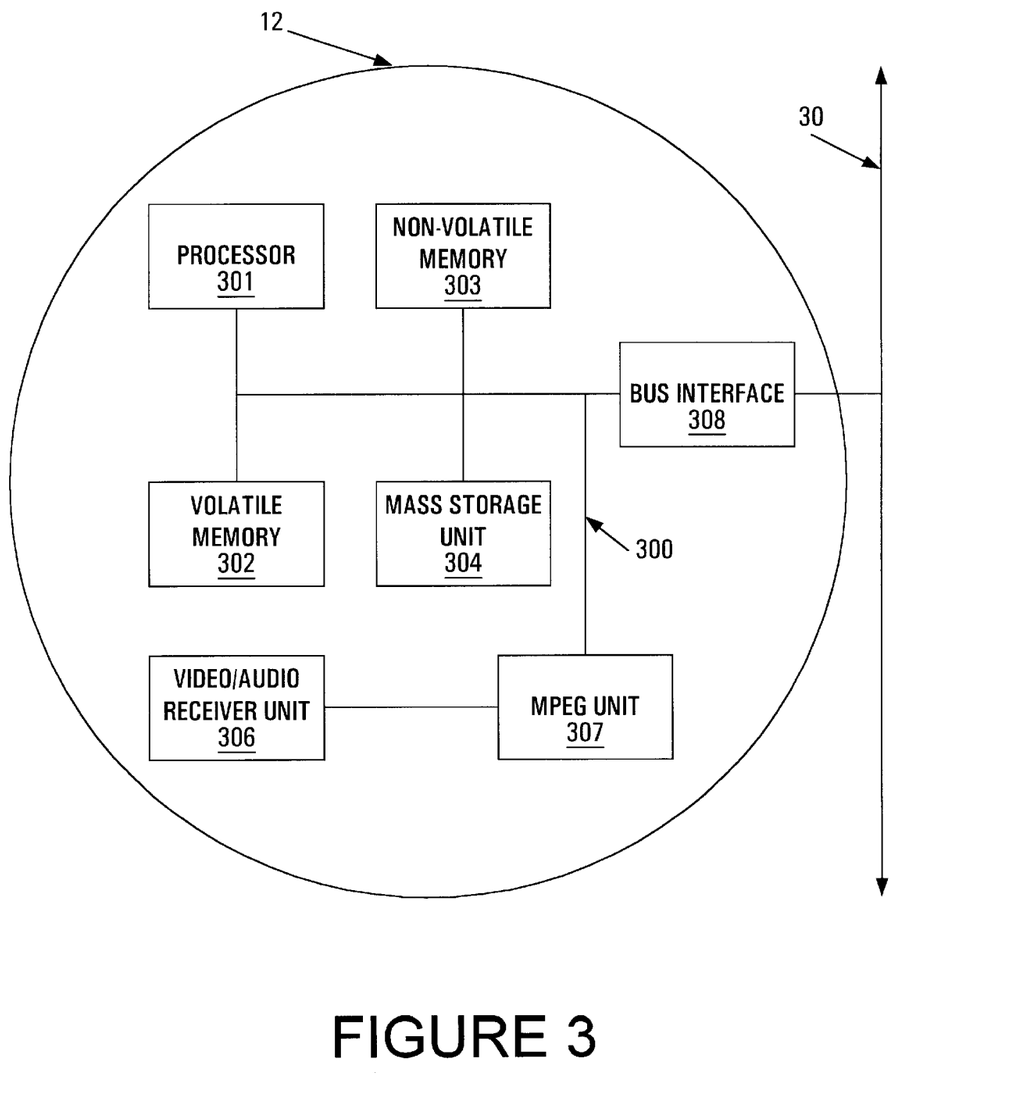
FIG. 3 is a block diagram of a set top box used in accordance with one embodiment of the present invention.

Refer now to FIG. 3, which is a block diagram of set top box 12 upon which embodiments of the present invention can be implemented. Although a variety of different systems can be used in accordance with the present invention, an exemplary system is represented by set top box 12. In the present embodiment, set top box 12 is used to execute the program instructions for automatically allocating bus bandwidth on a home network in accordance with the present invention (e.g., process 500 of FIGS. 5A and 5B).

With reference to FIG. 3, in the present embodiment, set top box 12 includes processor 301 coupled with an internal address/data bus 300 for processing information and instructions. Volatile memory 302 (e.g., random access memory), for storing information and instructions for processor 301, is also coupled to bus 300. Non-volatile memory 303 (e.g., read only memory), for storing static information and instructions for processor 301, is coupled to bus 300. Set top box 12 optionally includes mass storage unit 304 (e.g., a data storage device such as a magnetic or optical disk and disk drive) coupled to bus 300 for storing information and instructions. Set top box 12 also includes video/audio receiver unit 306 and Moving Pictures Expert Group (MPEG) unit 307 coupled to bus 300. Bus interface 308 is used for interfacing with network bus 30.

In one embodiment of the HAVI architecture, the IEEE 1394 serial communication bus standard is used as a local bus platform to provide the common messaging system. The IEEE 1394 serial communication bus carries both commands and status information as well as digital audio and digital video signals between devices. One significant attribute of the IEEE 1394 technology used in the HAVI architecture is isochronous data flow. The stream manager provides an application program interface (API) for configuring end-to-end isochronous ("streaming") connections. Connections may be point-to-point or utilize just sources or just sinks (also referred to as "broadcast-out" and "broadcast-in" connections).

The properties of streams are summarized as follows: 1) a stream is associated with a globally unique stream identifier; 2) a stream is carried over a single channel; 3) output functional component plugs ("plugs") and input plugs can join a stream (this can also be stated as "connect to the channel"); 4) a channel can be connected to zero or more output plugs and zero or more input plugs; 5) an input plug can join at most one stream; 6) an output plug can join many streams (for example, a functional component output plug attached to several device output plugs); 7) a stream can be created with no output plug, but no data will flow over the stream until an output plug has joined; and 8) the upper limit on the number of plugs that can be connected to a channel is transport type dependent. Streams allow the overlaying of connections as described in IEC-61883, e.g., a plug may have many connections (both point-to-point and broadcast) to the channel used by the stream.

Figure 4:
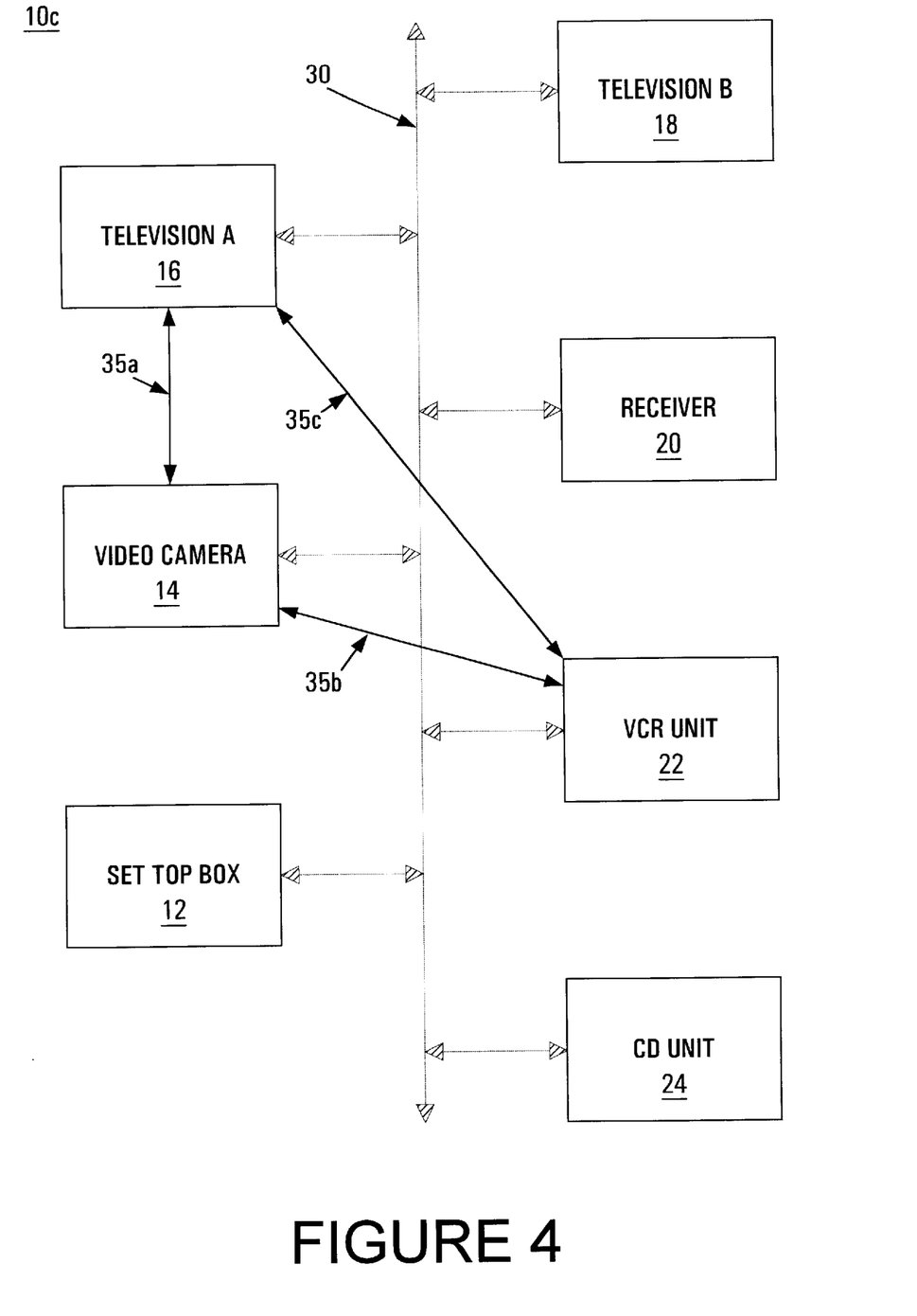
FIG. 4 illustrates a communication channel topology of the home audio/visual network of FIG. 1 in accordance with the present invention.

FIG. 4 illustrates a channel topology 10c of the exemplary HAVI architecture network illustrated in FIG. 1. Consumer electronic devices 12–24 are each coupled to network bus 30, as explained above. In the example of FIG. 4, the stream manager is implemented by set top box 12; however, as explained above, it is understood that the stream manager is implemented on any type of FAV or IAV device in a HAVI architecture network. Set top box 12 communicates messages and commands to consumer electronic devices 14–24 via the common messaging system that is typical of a HAVI architecture network.

Continuing with reference to FIG. 4, communication channels 35a–35d are allocated between certain devices, allowing these devices to stream data between each other (for clarity, FIG. 4 does not show the channels connecting set top box 12 to each of devices 14–24). Communication channels 35a–35d exist on network bus 30; however, for illustration purposes only, they are shown as separate from network bus 30. For example, communication channel 35c is allocated over network bus 30 between television A 16 and VCR unit 22; thus, these two devices are able to communicate over network bus 30 via communication channel 35c.

In the HAVI-compliant home network, a device control module (DCM) exists for each consumer electronic device known in that network. The DCM is a software element that provides a network interface for the consumer electronic devices on the network. Associated with a DCM are one or more functional control modules (FCMs). FCMs are software elements that represent the various functional components (e.g., a tuner, an amplifier, etc.) within the consumer electronic device. The bandwidth capacity required by a device is provided by the device's FCM. The method in which DCMs and FCMs are implemented with the present invention is in accordance with the application entitled "A Home AudioNideo Network with Both Generic and Parametized Device Control;" Filing Date Jan. 6, 1998; Ser. No. 09/003,097; by Rodger J. Lea; assigned to the assignee of the present invention which is hereby incorporated by reference.

In a HAVI-compliant home network, each device registers with a registry. The registry is a software element located on a HAVI-compliant device such as a FAV (e.g., set top box 12 of FIG. 3). When a device registers, it provides its unique identifier and a self-description. The registry maintains, for each registered device, the device identifier and its attributes. The elements of a registry and the method by which a consumer electronic device registers with the registry are in accordance with the application entitled "Method and System Downloading Applications for Controlling Devices within a Home Audio/Video Network;" Filing Date Jan. 6, 1998; Ser. No. 09/003,412; by Rodger J. Lea; assigned to the assignee of the present invention and hereby incorporated by reference.

Stream Allocation in Home Networks

The present invention provides a system and method for allocating bandwidth on a network bus in a home network. The present invention implements an intelligent process to make adequate bus bandwidth available when a new channel is needed to connect a source device to a sink device. For example, a new channel is needed when a user wishes to transfer data from one device on the network to another device on the network, but a connection (e.g., a channel) between those two devices does not yet exist, or when a new device is added to the network and the use wishes to connect it to one or more devices already on the network.

Figure 5A:
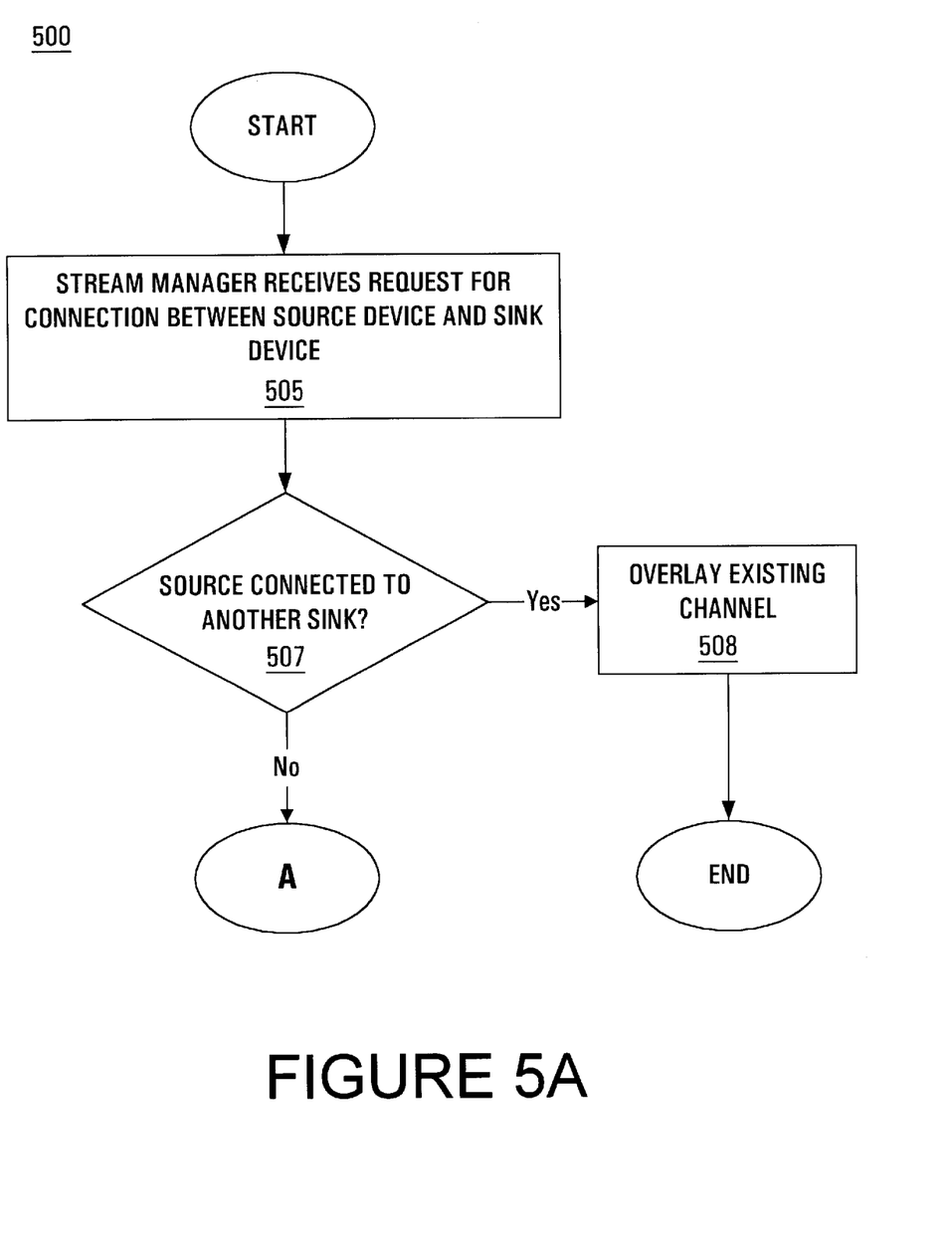
FIGS. 5A and 5B illustrate a flowchart of a process for allocating bandwidth and connecting devices in a home/audio visual network in accordance with one embodiment of the present invention.
Figure 5B:
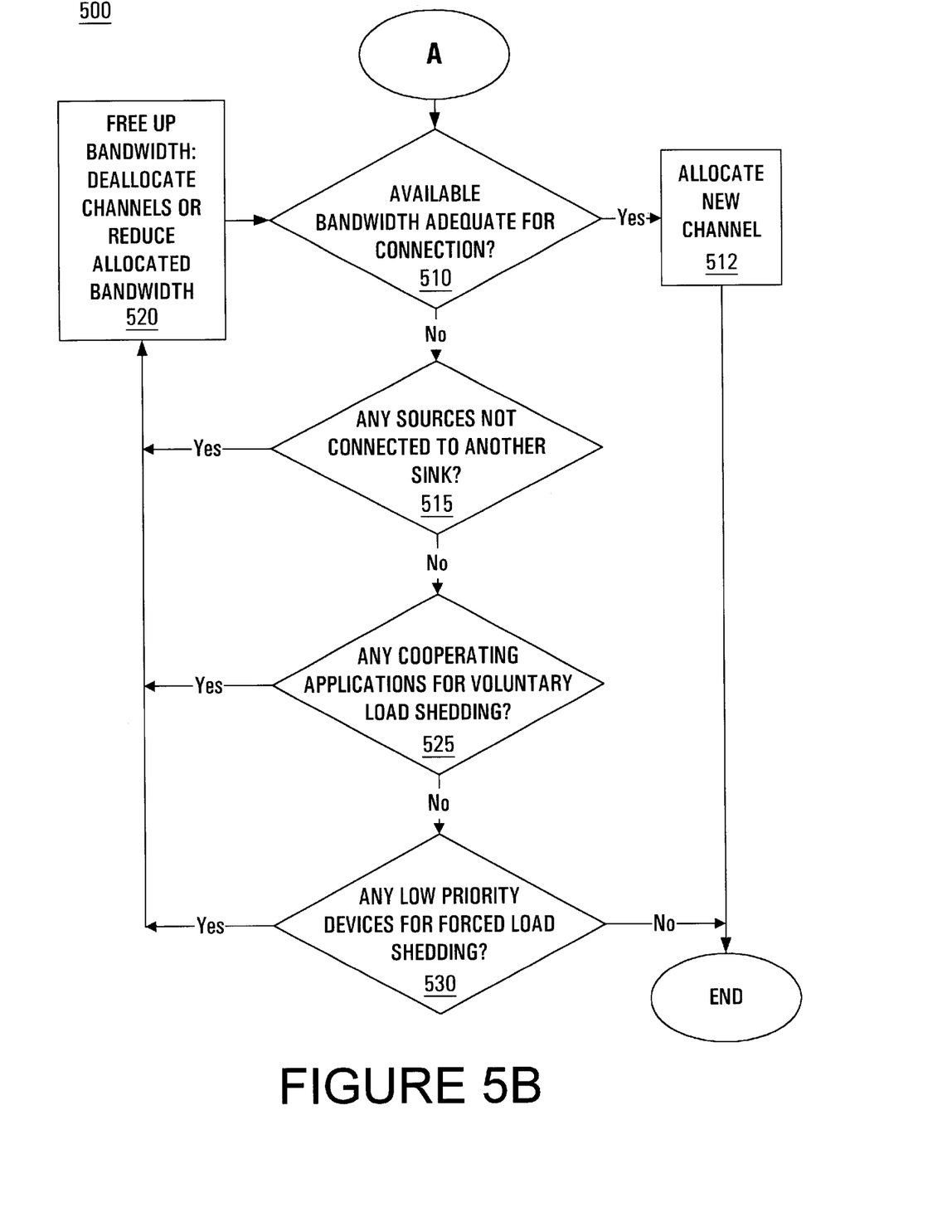

FIGS. 5A and 5B provide a flowchart of process 500 for allocating bus bandwidth on a home network in accordance with the present embodiment of the present invention. In the present embodiment, process 500 is implemented as program instructions in an intelligent device connected to the home network, such as set top box 12 of FIG. 3. In a home network compliant with the HAVI architecture, the present embodiment of the present invention is implemented as program instructions by the stream manager software element in a FAV or an IAV node. The present invention is integrated into and executed by an intelligent device connected to the home network, and hence is conveniently implemented in the home network. As will be seen by the description below, automatic features of the present invention make it user friendly.

With reference to FIG. 5A and to FIG. 4, in step 505 a request is made for a connection between two devices, from a specific source device to a specific sink device. The request is received by the stream manager software element of set top box 12, for instance.

The request of step 505 occurs as a result of a user of the home network initiating a request for a connection from a source device to a sink device. For example, as indicated by FIG. 4, video camera 14 and television B 18 are physically connected in the home network by network bus 30, but a communication channel between these two devices is not allocated and so data cannot be forwarded to television B 18 from video camera 14. A user wishing to view video camera 14 on television B 18 uses a controller device (e.g., set top box 12) to indicate his/her selection. In response to this selection, the request is automatically forwarded to the stream manager in accordance with the present invention. The stream manager then accesses the FCM software element (described above) to determine the required bandwidth capacity of video camera 14.

Another example of a request for a connection occurs when a satellite or cable feed is obtained for display on a digital television (DTV). First, the tuner receives the feed, and then forwards the data received over network bus 30 to a decoder device (not shown). A communication channel is requested for the period of time needed to make the connection from the tuner to the decoder, but the channel is subsequently deallocated while the data are being decoded. Once decoded, the data are load ed back onto network bus 30 to another device for "de-multiplexing." Again, a communication channel is requested for this period of time. The data are loaded on and off network bus 30 in this manner until the data reach the display device (e.g., the DTV). In this example, communication channels are allocated only when the data are being transmitted from one device to another over the network; the data are loaded off and on network bus 30 and so the various channels from the first device to the last device (e.g., from the tuner to the DTV) do not exist simultaneously. Requests for communication channels as the data progress through the network are made automatically in accordance with the present invention. As will be seen, the present invention implements a mechanism for providing adequate bus bandwidth capacity for this type of network transaction.

In step 507 of FIG. 5A, in accordance with the present invention, the stream manager of set top box 12 determines whether or not the source device (e.g., video camera 14) is already connected to another sink device (e.g., VCR unit 22) via a communication channel. As illustrated in FIG. 4, video camera 14 is connected via communication channel 35a to television A 16 and via channel 35b to VCR unit 22.

Thus, in step 508, because a communication channel exists from video camera 14 to a sink device, in accordance with the present invention an overlay of either communication channel 35a or communication channel 35b is made as described in IEC-61883. Thus, the present invention preserves existing channels when possible, and does not indiscriminately and unnecessarily deallocate an existing channel.

Referring back to step 507, if a communication channel does not presently exist from the source device, then it is necessary to allocate a new channel from that source device in order to make the connection desired by the user. For example, in the example of FIG. 4, a communication channel does not exist from CD unit 24, and so if the user desires to connect CD unit 24 to another device on the home network, it is necessary for a new channel to be allocated.

With reference now to FIG. 5B and also continuing with reference to FIG. 4, the situation in which a new communication channel needs to be allocated is addressed. As will be seen by the discussion below, the present invention utilizes a systematic approach for identifying the alternatives available to free up the bus bandwidth capacity needed for the new communication channel. The present invention considers, then executes, the alternatives according to a hierarchy that allows those devices that are considered most important by the user to continue to operate. The present invention operates as a single entity with access to the entire home network, and thus can coordinate actions across the network.

In step 508, in accordance with the present invention, the stream manager of set top box 12 evaluates whether or not adequate bandwidth capacity is present to accommodate the new communication channel. Using the information from the FCMs, the available bandwidth capacity of network bus 30 (that is, the bandwidth capacity remaining after considering the bandwidth capacity consumed by existing channels) is determined and compared against the bandwidth capacity required by the source device. In accordance with the present invention, the stream manager of set top box 12 makes a determination of whether or not adequate bandwidth capacity exists for the new communication channel. The present invention is thus able to utilize up-to-date and accurate information regarding the required bandwidth capacity as well as the available bandwidth capacity, thereby avoiding turning off devices and/or applications unnecessarily in order to free up bandwidth capacity.

In step 512 of FIG. 5B, provided that there is adequate bandwidth capacity, a new communication channel from the source device to the sink device is allocated by the stream manager. In the present embodiment, the method for allocating a new channel is that described by IEEE 1394.

In step 515 of FIG. 5B, in the instance where there is not adequate bus bandwidth capacity, it is necessary to deallocate bus bandwidth capacity allocated to devices on the network in order to create (e.g., free up) adequate bandwidth for the new communication channel. The present invention implements via the stream manager of set top box 12 an automatic and systematic method to identify bus bandwidth capacity that can be deallocated. That is, the present invention implements a method of voluntary and forced load shedding, thereby freeing up bandwidth capacity on network bus 30.

Continuing with step 515, with reference also to FIG. 4, in accordance with the present invention the stream manager of set top box 12 determines whether or not a situation exists in which an existing channel is allocated to a source device, but that source device is not using the existing channel. For example, communication channel 35c is allocated to television A 16 and communication channel 35d to television B 18, respectively, from VCR unit 22; however, consider a case in which television A 16 is subsequently turned off. In this case, communication channel 35c may still appear to be in use. Typically, in a HAVI architecture network, such a scenario is expected to result in deallocation of the existing channel; however, in case this does not occur, the present invention provides a means of checking.

In step 520 of FIG. 5B, bus bandwidth capacity that can be made available for a new communication channel is freed up, either by deallocating an existing channel or by reducing the bus bandwidth capacity required by a device on the network (e.g., by terminating a network application running on a device but leaving the device on). Hence, if one or more unused communication channels are found in step 515, then those channels are deallocated in accordance with the present invention, thereby freeing up unused bus bandwidth capacity that can be utilized for the new channel. As in step 510, the present invention determines whether or not the deallocation of the unused channel(s) frees up adequate bus bandwidth capacity to accommodate the new communication channel. Provided that adequate bus bandwidth capacity becomes available, the new channel is allocated as in. step 512. If adequate bus bandwidth capacity is not available, then the present invention continues the process of load shedding.

In step 525 of FIG. 5B, in accordance with the present invention, the stream manager of set top box 12 initiates a process of voluntary load shedding of devices and network applications that are operating on the home network. A device on the home network may be running a cooperating application (a network application that shares resources with other network applications to provide a service to the user). For example, a device on the home network without storage capability may use a remote device to store audio/visual content. Using the common messaging system of the HAVI architecture network, a message is emitted by the stream manager to these devices to determine if the associated channel can be deallocated or if the allocated bandwidth capacity can be reduced.

In the present embodiment, a communication channel allocated to a cooperating application cannot be unilaterally deallocated or reduced by the stream manager; the cooperating application grants authorization to the stream manager. Therefore, in step 525, in accordance with the present invention, the stream manager of set top box 12 queries those devices and applications that are presently running to determine which ones can be terminated.

At this point, in response to the query from the stream manager, those devices on the network with a capability to directly interface with a user typically will display a user interface to the user seeking input regarding what actions might be taken to free up bandwidth. For example, the device will display an advisory message to the user that network bandwidth capacity is needed for another device. In response to this message, the user can voluntarily terminate the device he/she is using, or perhaps voluntarily terminate one or more of the applications being executed by the device. Based on the directions received from the user, the device or application provides authorization to the stream manager to deallocate the associated communication channel or to reduce the bandwidth capacity of the associated communication channel (e.g., if an application is terminated but the device continues to operate).

Similarly, in response to the query from the stream manager, other types of devices and applications on the network have the capability to determine from their operating state that they are not fully utilizing the bandwidth capacity that has been allocated to them. These types of devices and applications can respond with authorization for the stream manager to reduce their allocated bandwidth capacity.

Hence, in accordance with the present invention, the communication channel(s) assigned to these devices are then deallocated as in step 520. Alternatively, the capacities of the communication channel(s) allocated to these devices and/or applications are reduced as described above.

The voluntary load shedding implemented in accordance with the present invention as described by step 525 thus frees up bus bandwidth for the new channel. Provided that the available bus bandwidth is adequate for a new channel (per step 510), a new channel is allocated as in step 512.

In step 530 of FIG. 5B, the present invention implements a systematic and intelligent process of forced load shedding of devices on the home network (if necessary, depending on the results of the previous steps). In the present embodiment, forced load shedding is implemented according to a priority ranking assigned to each device on the network by the user(s). The priority ranking is assigned to each device when the device is first connected to the home network, for example, and registered in the registry. Other means of assigning a relative priority to each device on the home network can be used in accordance with the present invention. The stream manager has access to the priority ranking from the registry.

In accordance with the present invention, in step 530 the stream manager of set top box 12 determines the lowest priority device attached to the network and deallocates the bandwidth capacity allocated to that device as in step 520; that is, the associated communication channel is deallocated or the bus bandwidth capacity is reduced. The forced load shedding frees up bus bandwidth for the new channel. Provided that the available bus bandwidth is adequate for a new channel (per step 510), a new channel is allocated as in step 512. If not enough bus bandwidth capacity is freed up, and if there is no further bus bandwidth capacity to be deallocated, a message conveying this information is displayed to the user.

Continuing with reference to FIGS. 5A and 5B, process 500 is implemented such that the decisions made in the early steps of the process can be revised if the information available to the stream manager changes while the process is being completed. The present invention monitors the transitory nature of the network traffic and implements process 500 based on the present condition. Thus, the present invention provides an ongoing assessment of available network bandwidth capacity, and makes and implements decisions using the information currently available. The present invention is not limited to implementing decisions based on an initial set of assumptions or on the set of assumptions that were in place when a communication channel was initially allocated to a device on the network.

Thus, the present invention provides a system and method to assist users in identifying and freeing up network bandwidth capacity when a new connection between devices on a home network is needed. The present invention is implemented as program instructions loaded on and executed by an intelligent device on the home network. The present invention operates as a single entity with access to the entire home network, and so is able to coordinate actions across the network to identify which devices are functioning on the network and which devices can be turned off or scaled back to free up bus bandwidth capacity. Accordingly, the present invention avoids turning off devices indiscriminately, and devices that are considered most important by the users are kept operating. The present invention performs its functions automatically in response to a request for a new connection between a source device and a sink device. The present invention identifies alternatives and considers them according to a hierarchy that results in the most favorable alternative being implemented. Automatic features of the present invention and its implementation on an intelligent device in the home network make it convenient and user friendly.

The preferred embodiment of the present invention, stream allocation in home networks, is thus described. While the present invention has been described in particular embodiments, it should be appreciated that the present invention should not be construed as limited by such embodiments, but rather construed according to the following claims.

What is claimed is:

1. In a network comprising a plurality of electronic audio/video devices coupled to a network bus, a method for allocating bus bandwidth capacity on said network bus, said method comprising the steps of:

a) receiving a request to allocate a channel between a source device and a sink device in said network;

b) determining an amount of bus bandwidth capacity required for said channel, wherein said bus bandwidth capacity required for said channel is specified by said source device;

c) comparing available bus bandwidth capacity of said network bus with said bus bandwidth capacity required to establish said channel; and d) provided said available bus bandwidth capacity is less than said bus bandwidth capacity required to establish said channel, initiating a process of voluntary load shedding, said process of voluntary load shedding comprising:

d1) sending a query to devices which have been allocated channels, each allocated channel having a respective allocated bus bandwidth, wherein responsive to said query each of said devices determines whether it is using its respective allocated bus bandwidth;

d2) receiving a response to said query from a device to which a channel had been allocated, said response providing authorization to reduce bus bandwidth allocated to said device; and d3) reducing bus bandwidth allocated to said device, wherein said channel allocated to said device remains allocated but with a reduced bus bandwidth.

2. The method of claim 1 further comprising the step of, responsive to said step d, allocating a channel on said network bus from said source device to said sink device.

3. The method of claim 1 wherein said network is an IEEE 1394 serial bus network.

4. The method of claim 1 wherein said plurality of devices are selected from the group consisting of: a television, an integrated receiver/decoder, a video cassette recorder, a digital video system, a home server, a personal computer system, and a digital audio system.

5. The method of claim 1 wherein said method is implemented by a stream manager software element executing on an intelligent device coupled to said network bus.

6. The method of claim 1 further comprising the step of creating an overlay of an existing channel connected to said source device, said overlay establishing said connection between said source device and said sink device.

7. The method of claim 1 wherein said step d) comprises the steps of:

identifying an unused channel on said network bus; and deallocating said unused channel.

8. The method of claim 1 wherein said step d) comprises the steps of:
   identifying a cooperating application;
   sending a message to said cooperating application requesting authorization to deallocate bus bandwidth capacity allocated to said cooperating application;
   receiving an affirmative response from said cooperating application; and
   deallocating bus bandwidth capacity allocated to said cooperating application.

9. The method of claim 1 wherein said step d) comprises the steps of:
   identifying a device in said network designated as a lowest priority device based on a priority ranking specified by a user of said network; and
   deallocating bus bandwidth capacity allocated to said lowest priority device.

10. A network comprising:
    a network bus;
    a plurality of electronic audio/video devices coupled to said network bus, wherein one of said plurality of devices is an intelligent device having stored therein instructions for implementing a method to allocate bus bandwidth capacity on said network bus, said method comprising the steps of:
    a) receiving a request to allocate a channel between a source device and a sink device in said network;
    b) determining an amount of bus bandwidth capacity required for said channel, wherein said bus bandwidth capacity required for said channel is specified by said source device;
    c) comparing available bus bandwidth capacity of said network bus with said bus bandwidth capacity required to establish said channel; and
    d) provided said available bus bandwidth capacity is less than said bus bandwidth capacity required to establish said channel, initiating a process of voluntary load shedding, said process of voluntary load shedding comprising:
       d1) sending a query to devices which have been allocated channels, each allocated channel having a respective allocated bus bandwidth, wherein responsive to said query each of said devices determines whether it is using its respective allocated bus bandwidth;
       d2) receiving a response to said query from a device to which a channel had been allocated, said response providing authorization to reduce bus bandwidth allocated to said device; and
       d3) reducing bus bandwidth allocated to said device, wherein said channel allocated to said device remains allocated but with a reduced bus bandwidth.

11. The network of claim 10 wherein said network is an IEEE 1394 serial bus network.

12. The network of claim 10 wherein said method further comprises the step of creating an overlay of an existing channel connected to said source device, said overlay establishing said connection between said source device and said sink device.

13. The network of claim 10 wherein said step d) of said method comprises the steps of:
    identifying an unused channel on said network bus; and
    deallocating said unused channel.

14. The network of claim 10 wherein said step d) of said method comprises the steps of:
    identifying a cooperating application;
    sending a message to said cooperating application requesting authorization to reduce bus bandwidth capacity allocated to said cooperating application;
    receiving an affirmative response from said cooperating application; and
    deallocating bus bandwidth capacity allocated to said cooperating application.

15. The network of claim 10 wherein said step d) of said method comprises the steps of:
    identifying a device in said network designated as a lowest priority device based on a priority ranking specified by a user of said network; and
    deallocating bus bandwidth capacity allocated to said lowest priority device.

16. In a network having a plurality of electronic audio/video devices coupled to a network bus, a software-implemented system for allocating bus bandwidth capacity on said network bus, said system comprising:
    a messaging means for sending a request to allocate a channel between a source device and a sink device in said network; and
    a stream manager means for determining an amount of bus bandwidth capacity required for said channel, wherein said bus bandwidth capacity required for said channel is specified by said source device, said stream manager means also for comparing available bus bandwidth capacity of said network bus with said bus bandwidth capacity required for said channel and, provided said available bus bandwidth capacity is less than said bus bandwidth capacity required to establish said channel, said stream manager means for performing a process of voluntary load shedding comprising:
    sending a query to devices which have been allocated channels, each allocated channel having a respective allocated bus bandwidth, wherein responsive to said query each of said devices determines whether it is using its respective allocated bus bandwidth;
    receiving a response to said query from a device to which a channel had been allocated, said response providing authorization to reduce bus bandwidth allocated to said device; and
    reducing bus bandwidth allocated to said device, wherein said channel allocated to said device remains allocated but with a reduced bus bandwidth.

17. The network of claim 16 wherein said network is an IEEE 1394 serial bus network.

18. The network of claim 16 wherein said stream manager means creates an overlay of an existing channel connected to said source device, said overlay establishing said connection between said source device and said sink device.

19. The network of claim 16 wherein said stream manager means identifies an unused channel on said network bus and deallocates said unused channel.

20. The network of claim 19 wherein said stream manager means is also for identifying a cooperating application and deallocating bus bandwidth capacity allocated to said cooperating application after receiving authorization from said cooperating application.

21. The network of claim 20 wherein said stream manager means is also for identifying a device in said network designated as a lowest priority device based on a priority ranking specified by a user of said network and deallocating bus bandwidth capacity allocated to said lowest priority device.

* * * * *